United States Patent [19]
Gal et al.

[11] Patent Number: 5,630,991
[45] Date of Patent: May 20, 1997

[54] LIMESTONE-BASED WET FLUE GAS DESULFURIZATION PROCESS

[75] Inventors: Eli Gal, Lititz; Michael L. Mengel, Fredericksburg, both of Pa.

[73] Assignee: General Electric Co., Schenectady, N.Y.

[21] Appl. No.: 291,212

[22] Filed: Aug. 16, 1994

[51] Int. Cl.$^6$ .................................... B01D 53/50
[52] U.S. Cl. ................ 423/243.01; 423/243.06; 423/243.08
[58] Field of Search ............ 423/243.01, 243.06, 423/243.08, 357; 210/903

[56] References Cited

U.S. PATENT DOCUMENTS

| | | | |
|---|---|---|---|
| 3,632,306 | 1/1972 | Villers-Fisher et al. | 23/2 SQ |
| 3,876,750 | 4/1975 | Hauser | 423/242 |
| 4,818,506 | 4/1989 | Lin et al. | 423/242 |
| 4,911,901 | 3/1990 | Ogawa et al. | 423/242 |
| 4,994,246 | 2/1991 | Moser et al. | 423/242 |
| 5,034,204 | 7/1991 | Moser et al. | 423/243 |
| 5,202,103 | 4/1993 | Chang et al. | 423/242.7 |
| 5,236,557 | 8/1993 | Müller et al. | 203/10 |
| 5,246,471 | 9/1993 | Bhat et al. | 55/223 |

FOREIGN PATENT DOCUMENTS

| | | |
|---|---|---|
| 2363793A | 7/1974 | Germany. |
| 2324547A | 11/1974 | Germany. |
| 54-99075 | 8/1979 | Japan ............... 423/243.06 |
| 55-139818 | 11/1980 | Japan ............... 423/243.06 |
| 1346815 | 6/1975 | United Kingdom. |
| 2232972 | 1/1991 | United Kingdom ......... 423/243.08 |

OTHER PUBLICATIONS

"Gas Purification" by Kohl et al.; 4th ed.; pp. 342–345 Gulf Publishing Co. (1985) (No Month).

Rochelle et al. "The Effect of Additives on Mass Transfer in $CaCo_3$ or CaO Slurry Scrubbing of $SO_2$ from Waste Gases" Ind. Eng. Chem. Fund. vol. 16 No. 1 (1977, No Month Cited) pp. 67–75.

*Primary Examiner*—Gary P. Straub
*Assistant Examiner*—Timothy C. Vanoy
*Attorney, Agent, or Firm*—Nixon & Vanderhye

[57] ABSTRACT

The limestone dissolution rate for limestone-containing slurries used in wet flue gas desulfurization (WFGD) systems is enhanced by the addition of ammonium ions. The ammonium ions may be obtained by incorporating into the limestone-containing slurry gaseous or aqueous ammonia and/or a water-soluble ammonium salt, such as ammonium sulfate, ammonium chloride, or ammonium carbonate. Increasing the limestone dissolution rate for limestone-containing slurries used in WFGD systems allows courser limestone particles, lower limestone stoichiometry and lower slurry recycle rates to be employed, thereby saving capital and operating costs. The ammonium ions may be recovered and reused in the process.

11 Claims, 4 Drawing Sheets

LIMESTONE DISS. RATE VS. Cl CONC.
98% CaCO3, 140F, average of 80-90% dissolved limestone

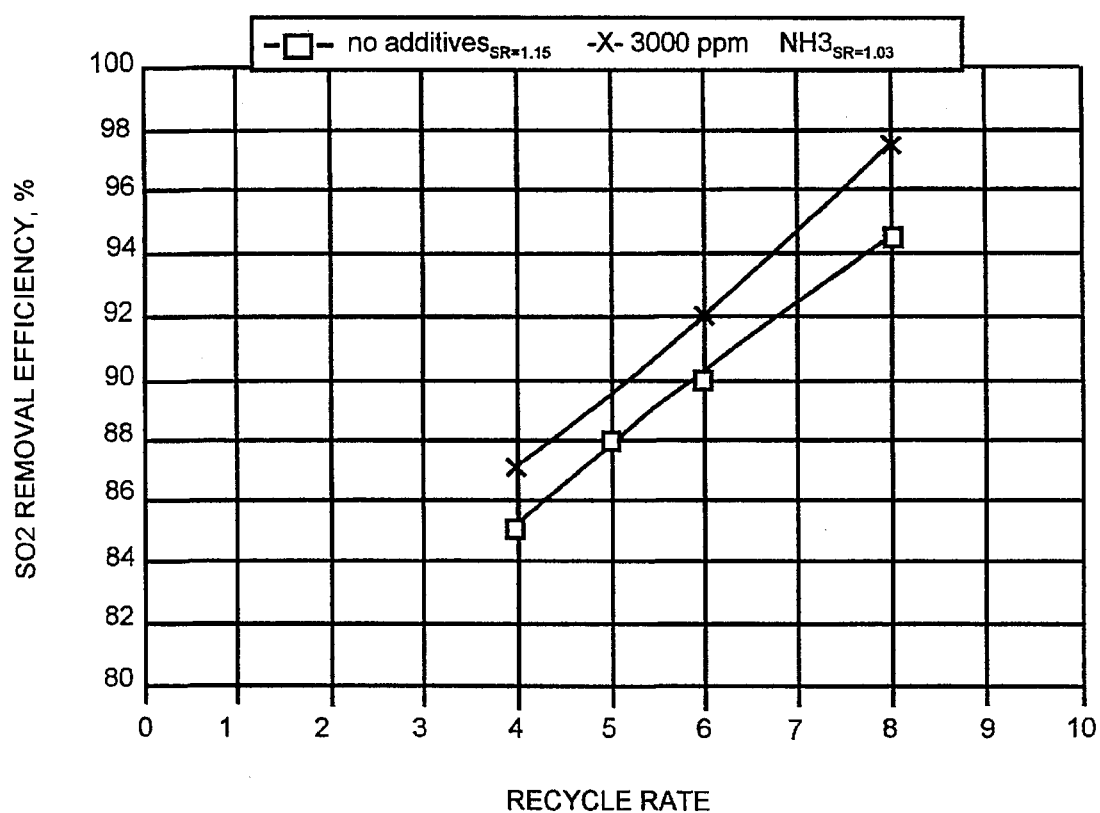

LIMESTONE-BASED WET FLUE GAS DESULFURIZATION PROCESS

FIELD OF INVENTION

The present invention generally relates to wet flue gas desulfurization systems. In preferred embodiments, the present invention provides a process for enhancing the performance of limestone-based Wet Flue Gas Desulfurization (WFGD) systems by the addition of a source of ammonium ions so as to increase the limestone dissolution rate, and thereby enhance sulfur removal efficiency.

BACKGROUND AND SUMMARY OF THE INVENTION

Limestone is a low cost naturally occurring chemical which is the preferred reagent in many conventional WFGD systems. However, under normal system operating conditions, the limestone dissolves slowly. Therefore, in order to increase the alkalinity of the limestone slurry used in conventional WFGD systems, and hence increase the system's $SO_2$ removal efficiency, excess limestone (typically ground to a particulate with 90–95% of the particles having a size of less than 325 mesh) is used and the reaction tank is oversized to allow sufficient retention time for limestone dissolution. Once the slurry containing the dissolved limestone is sprayed into the $SO_2$ absorber, the dissolved limestone is quickly depleted making the slurry ineffective in removing more $SO_2$ and requiring a high rate of slurry recycle. As a result, high capital and operating costs are required when low cost limestone is employed as the reagent in WFGD systems.

In order to improve WFGD system performance, other additives such as adipic acid and dibasic organic acids have been utilized. However, these additives are relatively expensive, tend to oxidize and cannot be recovered from waste water. While such additives improve system performance by buffering the slurry pH and improving its effectiveness, the performance enhancement that is achieved in many cases is not of a sufficient magnitude to justify the increased make-up cost of the additives.

Therefore, it would especially be desirable if the capital and operating costs of limestone-based WFGD systems could be reduced by the use of a low cost recoverable additive while, at the same time, achieving significantly increased limestone dissolution rates (and hence increased $SO_2$ removal efficiency). It is towards providing such performance-enhanced limestone-based WFGD systems that the present invention is directed.

Broadly, the present invention is directed toward incorporating a source of ammonium ions in a limestone-based WFGD system. In this regard, it has been found that the presence of ammonium ions in an aqueous limestone-containing slurry increases the dissolution rate of the limestone and thereby enhances $SO_2$ removal efficiency of the WFGD system in which such slurry is used.

Further aspects and advantages of this invention will become more clear after careful consideration is given to the following detailed description of the preferred exemplary embodiments thereof.

BRIEF DESCRIPTION OF THE DRAWINGS

Reference will hereinafter be made to the accompanying drawings wherein like reference numerals throughout the various FIGURES denote like elements, and wherein;

FIG. 4 shows curves of $SO_2$ removal efficiency versus recycle rate comparing a limestone slurry containing no additives and one containing 3000 ppm $NH_3$ according to the present invention.

DETAILED DESCRIPTION OF THE PREFERRED EXEMPLARY EMBODIMENTS

Figure 1:
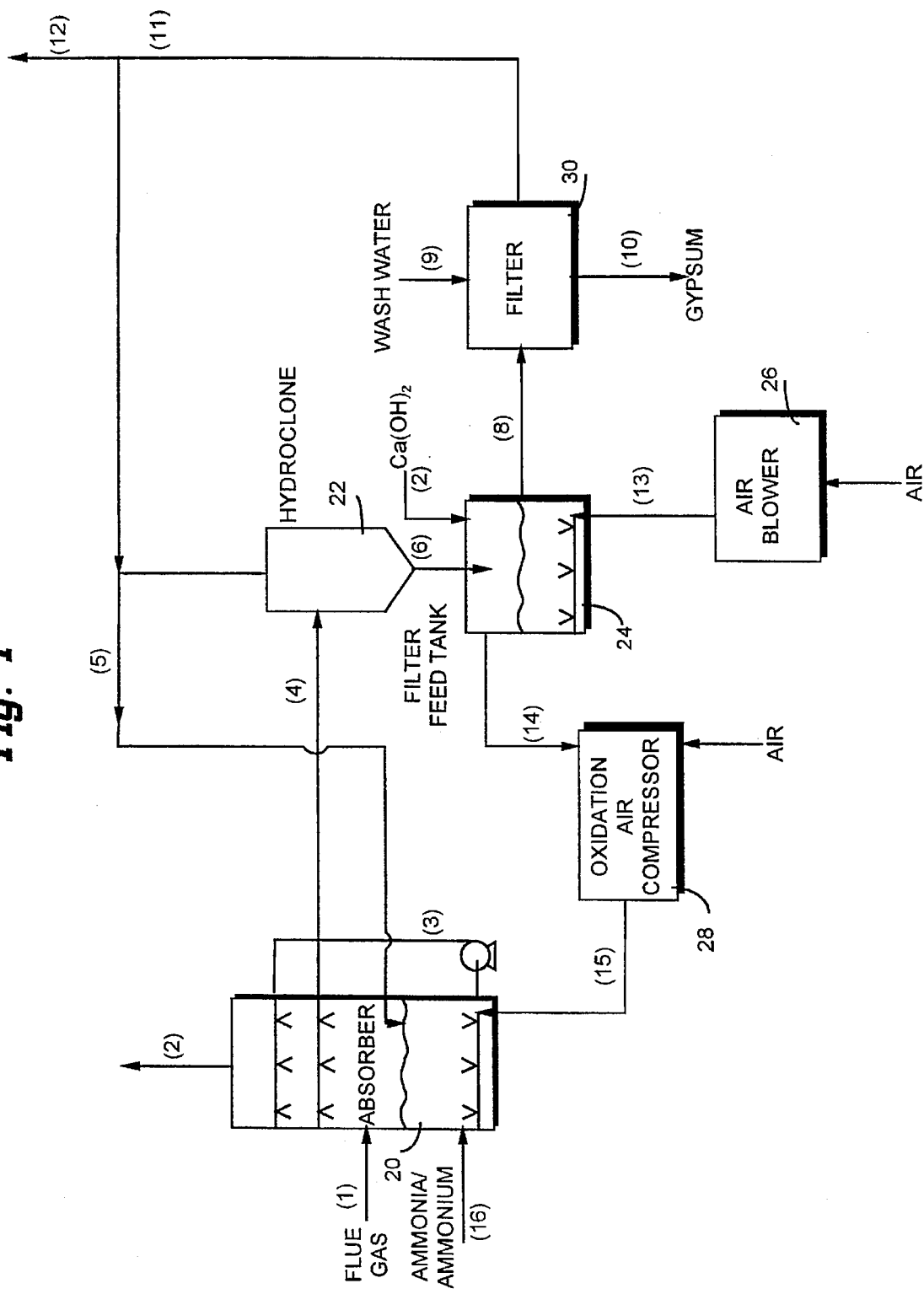
FIG. 1 is a schematic flow diagram of a preferred wet flue gas desulfufization system according to the present invention.

A schematic flow diagram of a particularly preferred ammonium-ion enhanced WFGD system according to the present invention is depicted in accompanying FIG. 1. As is seen, flue gas containing $SO_2$ (Stream 1) flows into an absorber 20 where the $SO_2$ is captured by a recycle spray (Stream 3) containing gypsum, limestone and dissolved ammonium (or other source of ammonium ions as will be discussed below) which increases limestone dissolution rate and improves system performance. The clean gas (Stream 2) is discharged from the system. A bleed stream from the recycle loop (Stream 4) flows to a hydrocyclone 22 from which the overflow (Stream 5) returns to the absorber 20 and the underflow (Stream 6) flows into a filter feed tank 24. The filter feed tank can be used for recovering some, or most, of the ammonium.

Calcium hydroxide (Stream 7) is added to the slurry in the filter feed tank 24 to raise its pH to between about 9 to about 11. Air (Stream 13) from an air blower 26 is sparged to the bottom of the filter feed tank 24 stripping ammonia from the slurry. The air laden with ammonia (Stream 14) is then mixed with the oxidation air (Stream 15) from the oxidation air compressor 28, and flows to the bottom of the absorber to oxidize sulfite into sulfate and to recover the ammonia as ammonium by reaction with the slurry in the absorber. The ammonia lean slurry from the filter feed tank (Stream 8) is dewatered in a filter 30. Wash water (Stream 9) is used to remove chlorides and traces of ammonium from the filter cake. The wash water also dissolves excess lime from the filter cake. As a result, clean gypsum cake (Stream 10) is discharged from the filter containing a low concentration of ammonia or ammonium salts. By the stripping of ammonia from the slurry in the filter feed tank, or washing the filter cake, the ammonia or ammonium salts in the gypsum can be lowered to about 5 parts per million (ppm) or less, preferably about 1 ppm or less. The filtrate (Stream 11) is recycled back to the absorber. To purge the system from chlorides, a bleed stream can be diverted to waste water treatment (Stream 12). Furthermore, in order to lower the ammonium concentration in the waste water, more ammonia can be stripped by rasing the pH to between about 11 to about 12 by adding small quantities of sodium hydroxide to the water with air sparging. In this way the waste water discharge can stripped of ammonia or ammonium salts to as low as 5 ppm or less, preferably about 1 ppm or less.

As an alternative embodiment, the bleed from the absorber can flow directly to the filter feed tank thereby eliminating the use of the hydrocyclone. Also, removing of the ammonium from the cake can be accomplished by efficient cake washing. In this regard, a 99%+washing efficiency can be achieved thereby reducing ammonium concentration in the cake to just a few ppm.

As noted briefly above, the performance-enhancing additive that is incorporated in the limestone slurry in the WFGD system according to this invention is a source of ammonium ions and thus may be in the form of gaseous or aqueous ammonia or a water-soluble ammonium salt, such as ammonium sulfate, ammonium chloride, ammonium carbonate, urea and the like. When added to the limestone-containing slurry in the WFGD system according to the present invention, the ammonium ions in the solution increases the rate of limestone dissolution.

In preferred embodiments, the limestone-containing slurries used in the WFGD systems according to the present invention will include at least about 500 ppm ammonium ions. Higher concentrations of ammonium ions will typically be needed with increasing concentrations of chloride ions in the limestone-containing slurry. Thus, for example, about 1000 ppm ammonium ions will typically be sufficient with little or no chloride ions present, but can be greater than about 6000 ppm ammonium ions if a significant amount (e.g., about 50,000 ppm) of chloride ions are also present. Thus, according to the present invention, the ammonium ions will be present in the limestone-containing slurry in an amount between about 500 to about 7500 ppm, and preferably between about 1000 ppm to about 6500 ppm. With these levels of ammonium ions present in the limestone-containing slurry, dissolution rates of the limestone (expressed in mmoles of $CaCO_3$ dissolved per hour per gram (mmole/h/g) of limestone) of greater than about 20 mmole/h/g, and typically greater than about 40 mmole/h/g (e.g., between about 40 to about 150 mmole/h/g) may be achieved.

Figure 2:
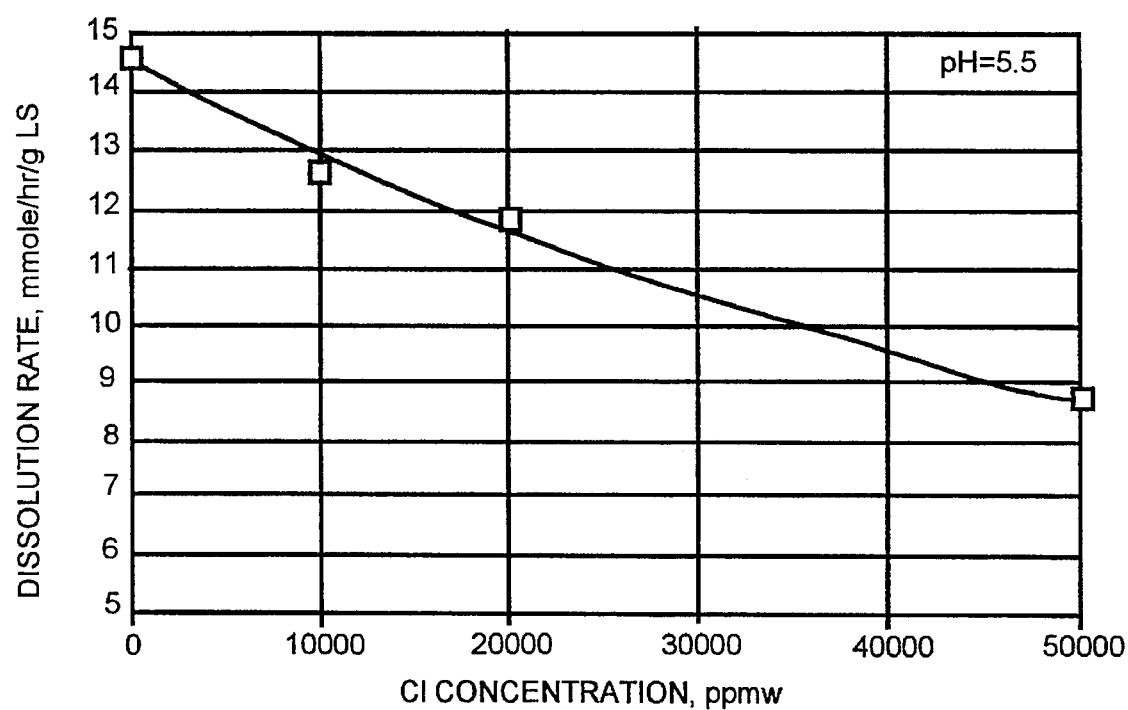
FIG. 2 is a dissolution rate curve for limestone (95% particle size less than 325 mesh) at 140° F. and 5.5 pH as a function of dissolved chloride.

In this regard, accompanying FIG. 2 shows a typical dissolution rate curve for limestone particles (95% of the particles having a size of less than 325 mesh) at 140° F. and 5.5 pH as a function of dissolved chloride. The dissolution rate in FIG. 2 is measured for limestone when, on average, between 80–90% of its original mass has been dissolved. As is shown in FIG. 2, the dissolution rate of the limestone is 14.6 mmole/h/g with no chlorides in the slurry and decreases to 11.8 and 8.8 mmole/h/g with 20,000 and 50,000 ppm chlorides (added as $CaCl_2$), respectively.

Figure 3:
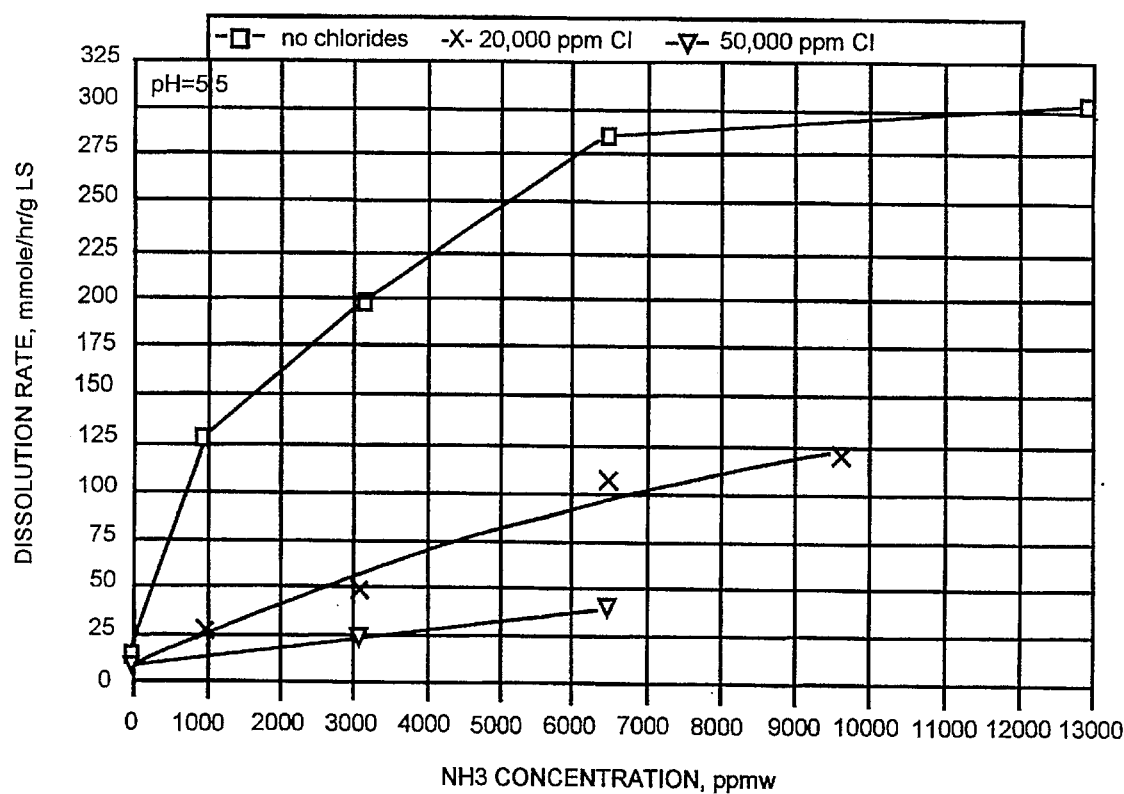
FIG. 3 shows limestone dissolution rate curves at several levels of dissolved chloride indicating the performance enhancement achieved by the presence of ammonium ions according to the present invention.

The impact of dissolved ammonium ions on the limestone dissolution rate is shown by the dissolution rate curves in accompanying FIG. 3. As is seen therein, with no chlorides present, the dissolution rate increased from 14.6 mmole/h/g to 127 mmole/h/g when 1000 ppm ammonium ions (as ammonium sulfate) are added to the slurry. The rate increases to 197 and 286 mmole/h/g when 3090 ppm and 6440 ppm ammonium ions are used, respectively. With 50,000 ppm chlorides, the dissolution rate is only 8.8 mmole/h/g, but increases five-fold to 42.4 mmole/h/g with 6440 ppm ammonium ions in the solution.

The significant increase in limestone dissolution rate allows operators of WFGD systems to use coarser limestone particles, lower limestone stoichiometry and/or lower the slurry recycle rate, thereby saving capital and operating costs. In accompanying FIG. 4, the $SO_2$ removal efficiency is shown as a function of recycle rate with no additives and with 3000 ppm ammonium ions in the solution. Under similar operating conditions $SO_2$ removal efficiency is 2–3% higher when ammonium ions are added to the system even though limestone stoichiometry is only 1.03 as compared to 1.15.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wet flue gas desulfurization process comprising the steps of:
   (a) bringing a sulfur-containing flue gas into contact with an aqueous limestone-containing slurry which includes a limestone-dissolution rate enhancing effective amount of ammonium ions in an absorber;
   (b) forcing oxidation air into the absorber so as to oxidize sulfite therein to sulfate;
   (c) removing desulfurized gas from the absorber; and
   (d) recovering the ammonium ions from the slurry and recycling the recovered ammonium ions to the absorber; wherein
   step (d) includes the steps of:
   (I) transferring a stream of the slurry containing the ammonium ions from the absorber to a filtration tank;
   (II) bringing the slurry into contact with calcium hydroxide within the filtration feed tank, while concurrently sparging the filtration feed tank with air so as to strip ammonia from the slurry and form an ammonia-lean slurry and an ammonia-rich air stream;
   (III) dewatering and washing the ammonia-lean slurry so as to obtain a gypsum cake having less than 5 ppm ammonia; and
   (IV) mixing at least a portion of the ammonia-rich air stream obtained according to step (II) with the oxidation air prior to the absorber so that a mixture of the ammonia-rich air stream and the oxidation air is forced into the absorber during practice of step (b) to thereby provide a source of the ammonium ions therein.

2. A process as in claim 1, wherein said ammonium ions are obtained from at least one source of ammonium ions selected from the group consisting of ammonia and water-soluble ammonium salts.

3. A process as in claim 2, wherein said water-soluble ammonium salts include ammonium sulfate, ammonium chloride, ammonium carbonate, and urea.

4. A process as in claim 1, wherein said ammonium ions are present in said slurry in an amount between about 500 to about 7500 ppm.

5. A process as in claim 4, wherein said slurry also contains between 0 to about 50,000 ppm chloride ions.

6. A process as in claim 1, wherein said ammonium ions are present in an amount effective to achieve a limestone dissolution rate of at least about 20 mmole/h/g.

7. A process as in claim 1, wherein said ammonium ions are present in an amount effective to achieve a limestone dissolution rate of at least about 40 mmole/h/g.

8. A process as in claim 1, wherein said ammonium ions are present in an amount effective to achieve a limestone dissolution rate of between about 40 mmole/h/g to about 150 mmole/h/g.

9. A process as in claim 1, wherein step (III) includes filtering the gypsum cake, and washing the gypsum cake with wash water to strip trace ammonia therefrom.

10. A process as in claim 9, further comprising air sparging the wash water from the gypsum cake and adding sodium hydroxide to the wash water to raise the pH to about 11 to 12 to strip ammonia from the wash water.

11. A process as in claim 1, wherein step (b) includes compressing the oxidation air prior to the absorber.

* * * * *